(12) United States Patent
Henchon

(10) Patent No.: US 12,104,924 B1
(45) Date of Patent: Oct. 1, 2024

(54) LED LIGHT DISPLAY LEVEL

(71) Applicant: Jerry L Henchon, Owingsville, KY (US)

(72) Inventor: Jerry L Henchon, Owingsville, KY (US)

( * ) Notice: Subject to any disclaimer, the term of this patent is extended or adjusted under 35 U.S.C. 154(b) by 0 days.

(21) Appl. No.: 18/758,222

(22) Filed: Jun. 28, 2024

Related U.S. Application Data

(60) Provisional application No. 63/628,230, filed on Jul. 3, 2023.

(51) Int. Cl.
*G01C 9/06* (2006.01)

(52) U.S. Cl.
CPC ......... *G01C 9/06* (2013.01); *G01C 2009/066* (2013.01)

(58) Field of Classification Search
CPC .............. G01C 9/06; G01C 2009/062; G01C 2009/064; G01C 2009/066; G01C 2009/068
USPC ............................................ 33/348.2, 366.27
See application file for complete search history.

(56) References Cited

U.S. PATENT DOCUMENTS

| | | | | |
|---|---|---|---|---|
| 1,542,512 A * | 6/1925 | Lett | ........................... | G01C 9/32 33/348.2 |
| 5,136,784 A * | 8/1992 | Marantz | ................... | G01C 9/16 33/366.27 |
| 5,313,713 A * | 5/1994 | Heger | ...................... | G01C 9/06 33/343 |
| 5,450,676 A * | 9/1995 | Thornsberry | ............ | G01C 9/06 33/366.16 |
| 5,488,779 A * | 2/1996 | Schultheis | ............... | G01C 9/32 33/366.27 |
| 5,780,848 A * | 7/1998 | Thompson | ............... | G01C 9/20 33/366.11 |
| 5,956,260 A * | 9/1999 | Heger | ...................... | G01C 9/06 345/23 |
| 7,322,118 B2 | 1/2008 | Huang et al. | | |
| 7,743,520 B1 | 6/2010 | Jiorle | | |
| 8,443,524 B2 * | 5/2013 | Kildevaeld | .............. | G01C 9/32 33/381 |

(Continued)

*Primary Examiner* — George B Bennett
(74) *Attorney, Agent, or Firm* — Michael Coblenz

(57) ABSTRACT

The invention is a modification of a standard level used for construction work to determine if a surface is horizontal, of to draw a reference line to indicate horizontal. The invention is an elongated 2×4 housing that is 24" long. In the center of the housing is a cut-out for a digital display of a length of LED lights, in the preferred embodiment nine lights. There are two cut-outs on either side of the center to provide hand-holds. Between these hand-hold cut-outs are circular displays with an LED strip with three lights. There is an on/off switch on one side and a control switch on the other side. When the control switch is turned on it activates an internal level circuit board is activated. When the level is placed on a surface it will display green when level. If it is not level it will display red, with a white light showing which way to move the level, similar to a standard level bubble. For example, if the white light is to the right it means that side is higher, and the left side must be lifted to find level. The invention can also be used to show vertical (or 90 degrees from horizontal). When the control switch is pressed it will switch the control board to vertical mode, and the two small circular displays will indicate which way to move to find vertical.

9 Claims, 8 Drawing Sheets

(56) References Cited

U.S. PATENT DOCUMENTS

| | | | | |
|---|---|---|---|---|
| 8,522,446 | B1* | 9/2013 | Staudt | G01C 9/32 |
| | | | | 33/DIG. 21 |
| 8,661,701 | B2* | 3/2014 | Wixey | G01C 9/06 |
| | | | | 33/534 |
| 8,866,470 | B2* | 10/2014 | Taylor | G01C 9/06 |
| | | | | 324/207.25 |
| 10,088,311 | B2* | 10/2018 | Eskew | G01C 9/18 |
| 11,391,568 | B2 | 7/2022 | Neitzell et al. | |
| 11,512,954 | B2* | 11/2022 | Loebig | G01C 9/08 |
| 11,668,563 | B2* | 6/2023 | Sakakibara | G01C 9/04 |
| | | | | 33/366.27 |
| 11,692,820 | B2 | 7/2023 | Leidel et al. | |
| 2007/0180719 | A1* | 8/2007 | Donnelly | B60S 9/02 |
| | | | | 33/366.11 |
| 2008/0172894 | A1* | 7/2008 | Chang | G01C 9/06 |
| | | | | 33/366.16 |
| 2024/0219176 | A1* | 7/2024 | Maack | G01C 9/06 |

* cited by examiner

LED LIGHT DISPLAY LEVEL

CROSS REFERENCE TO RELATED APPLICATIONS

This application claims priority to U.S. provisional application Ser. No. 63/628,230, filed on Jul. 3, 2023, and incorporated fully herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

The present invention relates to a digital level with a prominent and visible LED light strip display to show when the level is and is not horizontal.

Description of the Related Art

Levels are used to determine if a surface is "level" or parallel with the horizon. Virtually all buildings are designed so that the floors are parallel to the horizon, and the walls "plumb" or vertical to the horizon, and virtually all furniture is designed to have flat upper surfaces that are parallel to the horizon. As a result, it is desirable to be able to have a device or tool used in the construction of buildings that shows that the floors are "level" or horizontal, and the walls are vertical, as well as to be able to build furniture so that surfaces are either horizontal or vertical. Levels have been around since at least 1661, when the Frenchman Melchisedech Thevenot developed the bubble level, which used a small cylindrical vial of a liquid with an air bubble that showed whether the device was horizontal, or level, when the bubble was in the center of the vial. The position of the bubble in the vial of liquid is controlled by gravity, so that when the vial is not horizontal the bubble will float up and away from the center. That means that when the bubble is to the right of center the right side of the "level" is higher than the left, and when it is to the left the left side his higher. Most modern levels still use the bubble, and these devices are common in carpentry and construction, and frequently used during construction to draw a reference line to show what is level. Most common levels now also include a second "bubble" which shows if the device is vertical, or positioned 90 degrees to horizontal. The standard bubble level has two reference lines a bubble-width apart in the middle of the vial, which allows the user to visually determine if the device is level when the air bubble in the liquid is visually in the center of the vial. The vial of the typical bubble level is roughly two inches long about roughly ½" in diameter. The vials are small and the user needs to be relatively close to the level to determine if it is "level."

It should be noted that in construction there are often situations where someone who is not in close proximity to a level needs to know if a surface is horizontal. It is not uncommon for crane operators to be moving a large object, like a steel beam, to position it level between two surfaces. This task is typically accomplished by the crane operator receiving signals from a worker near where the beam is to be placed. This is often done through hand signals, or verbally over a radio. Similarly, a fork-lift or front-end loader operator my be using the equipment to level a large flat object such as a floor joist or even a fully assembled flooring segment. Again, the operator typically relies on a worker position near the work-piece to give signals to indicate if the work-piece is level. There is a need, therefore, for a level that visually indicates horizontal or vertical, and that can be seen from a distance.

Digital levels have been around for many years. A typical digital level is show in U.S. Pat. No. 11,391,568, to Neitzell et al. The '568 patent, like all digital levels, uses a microprocessor and either an accelerometer or inclinometer that determines if the device is held parallel to the horizon, and can even determine the degrees off of horizontal. Such accelerometers and inclinometers are well known in the art. The level of the '568 patent looks much like a standard bubble level, which are typically a rod that is typically 1.5 inches by 3.5 inches, to mimic the size of a standard construction 2×4, and are typically roughly 24 inches long. The '568 patent level includes a standard bubble level, but also includes a digital read-out that shows the degrees off of horizontal of the device. While these devices are useful and highly accurate, one drawback is that the user has to be close enough to the level to read the bubble and the digital read-out. There is a need, therefore, for a digital level with an easy to see display.

SUMMARY OF THE INVENTION

The invention is a modification of a standard level used for construction or carpentry work to determine if a surface is level, or parallel to horizontal, or to draw a reference line to indicate horizontal or vertical for construction or carpentry use. The invention an elongated 2×4 rod or housing (actual dimensions 1.5"×3.5") that is roughly 25" long. In the center of the elongated housing is a cut-out for a digital display of a strip of LED lights, in the preferred embodiment nine lights. There are two oval cut-out holes on either side of the center to provide hand-holds. Between these hand-holds and the ends of the housing are two circular displays with vertical LED strips with three lights, which are used to indicate vertical. There is an on/off switch on one side, and an axis control switch on the other side. When the on/off control switch is turned on it activates an internal level controller circuit board and an orientation sensor, which can be either an accelerometer or an inclinometer. When the level is placed on a surface the LED lights will display red if the surface is not horizontal, with one white light acting as the bubble in a standard level to indicate which side of the level is higher. Once the level is horizontal, the white light will move to the center light, and all of the other lights will display green. The invention can also be used to show vertical (or 90 degrees from horizontal). When the axis control switch is pressed it will switch the controller circuit board and orientation sensor to vertical mode, and the two small circular displays will indicate which way to move to find vertical. The use of the LED lights and prominent and contrasting colors means that the device is visible from a distance, and workers not next to the device will be able to tell that it is level.

NOTE_CLAIMS here

DETAILED DESCRIPTION OF THE INVENTION

Detailed embodiments of the present invention are disclosed herein. It is to be understood that the disclosed embodiments are merely exemplary of the invention, and that there may be a variety of other alternate embodiments. The figures are not necessarily to scale, and some features may be exaggerated or minimized to show details of particular components. Therefore, specified structural and functional details disclosed herein are not to be interpreted as limiting, but merely as a basis for teaching one skilled in the art to employ the varying embodiments of the present invention.

Figure 1:
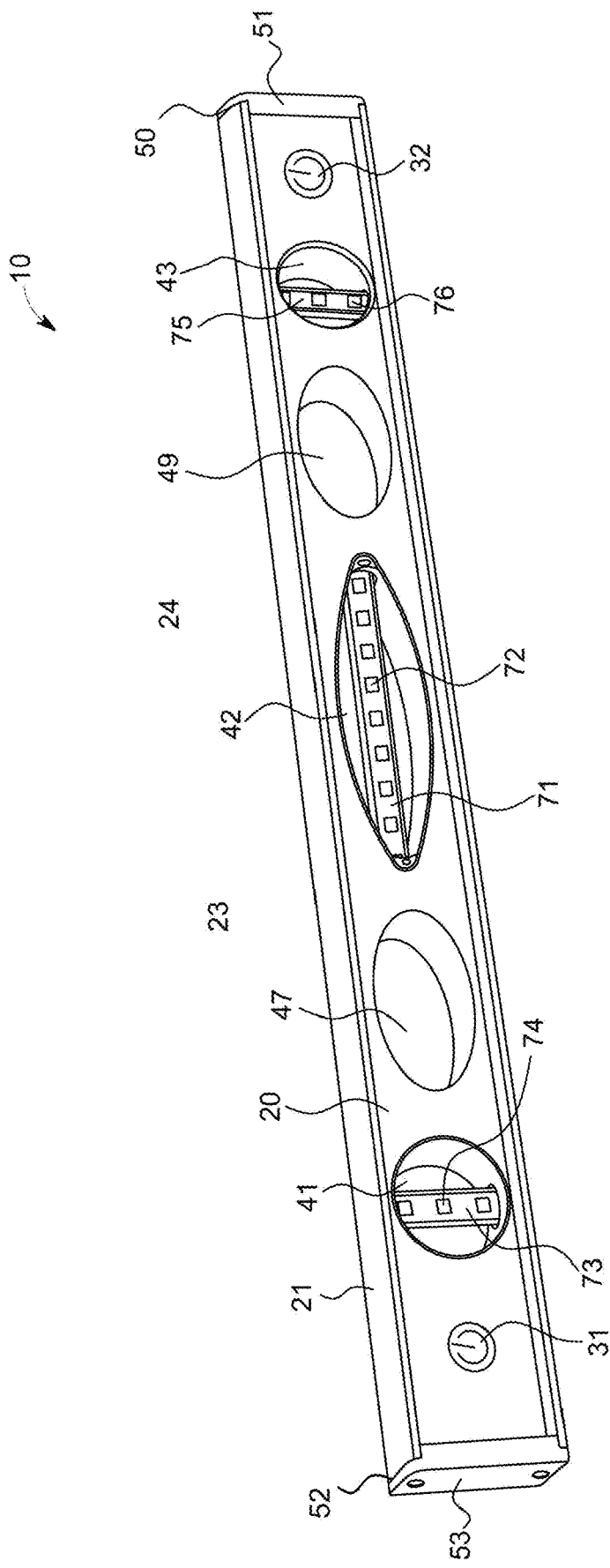
FIG. 1 is a perspective view of one embodiment of the visually enhanced LED light display level.
Figure 2:
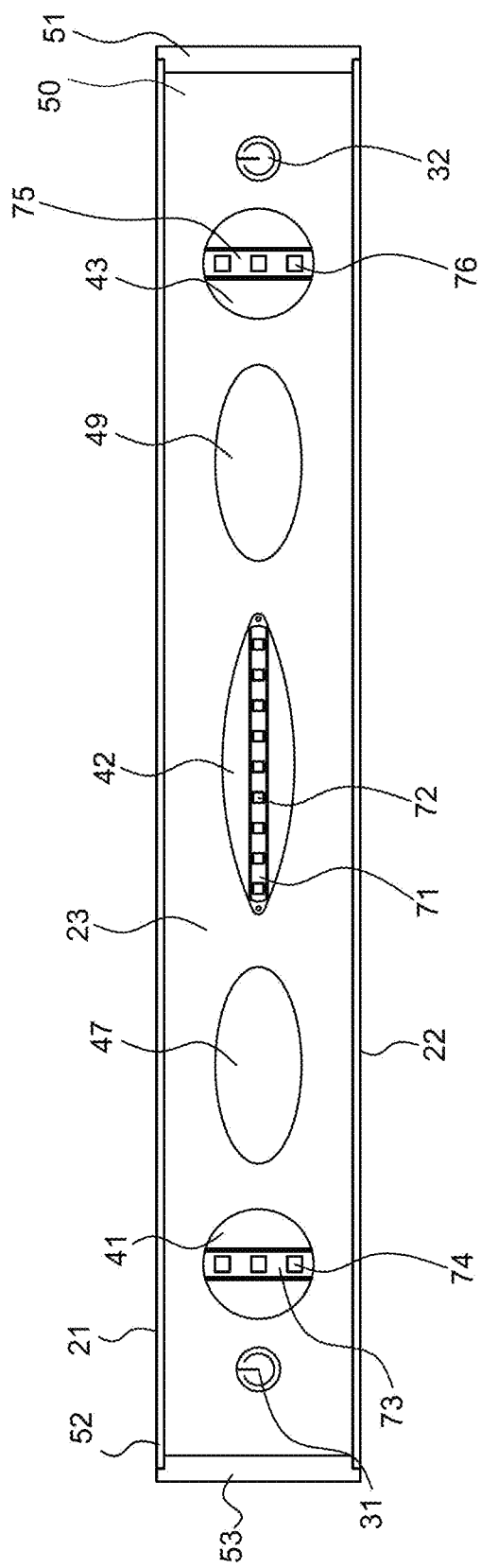
FIG. 2 is a front view of the level.

FIG. 1 is a perspective view and FIG. 2 is a front view of the Digital LED Display Level 10, showing the main components. The main component is the housing 20, which holds all of the other components. The housing 20 has a top 21, a bottom 22, a front 23, a back 24, a right end 50 and a left end 52. The top 21, and bottom 22, are flat planar surfaces and are parallel to each other so that the level 10 can be held in and used in any orientation, and so that straight and parallel lines can be drawn on either the top 21 or bottom 22 surfaces. In the preferred embodiment the housing 20 is sized to mimic a standard 2×4 piece of construction lumber, so the housing 20 is 3.5 inches from top 21 to bottom 22, and 1.5 inches from front 23 to back 24. This is typical for conventional levels. In the preferred embodiment the housing 20 is 25" long from the right end 50 to the left end 52. It is to be understood, and is within the conception of the invention, that the housing 20 can be longer or shorter as customer needs dictated. It is also possible for the housing 20 of the device to be significantly smaller and only consist of the circuitry, flat parallel top and bottom surfaces, and a single strip of the horizontal LED light strip.

Viewed from the front, the main components of the housing 20 are the left end cap 53, the power button 31, the left circular opening 41 with the first vertical LED light strip 73 contained therein, the left hand-hold opening 47, the central oval opening 42 with the horizontal LED light strip 71, the right hand-hold opening 49, the right circular opening 43 with the second vertical LED light strip 55, the axis control button 32, and the right end cap 51. The housing 20, like all standard levels, can be used in any orientation, so the components above are the same on the front 23 and back 24. The level 10 can also be used either on the top 21 or the bottom 22, and the components are visually simple and straightforward so the level 10 can be used in any orientation.

Figure 4:
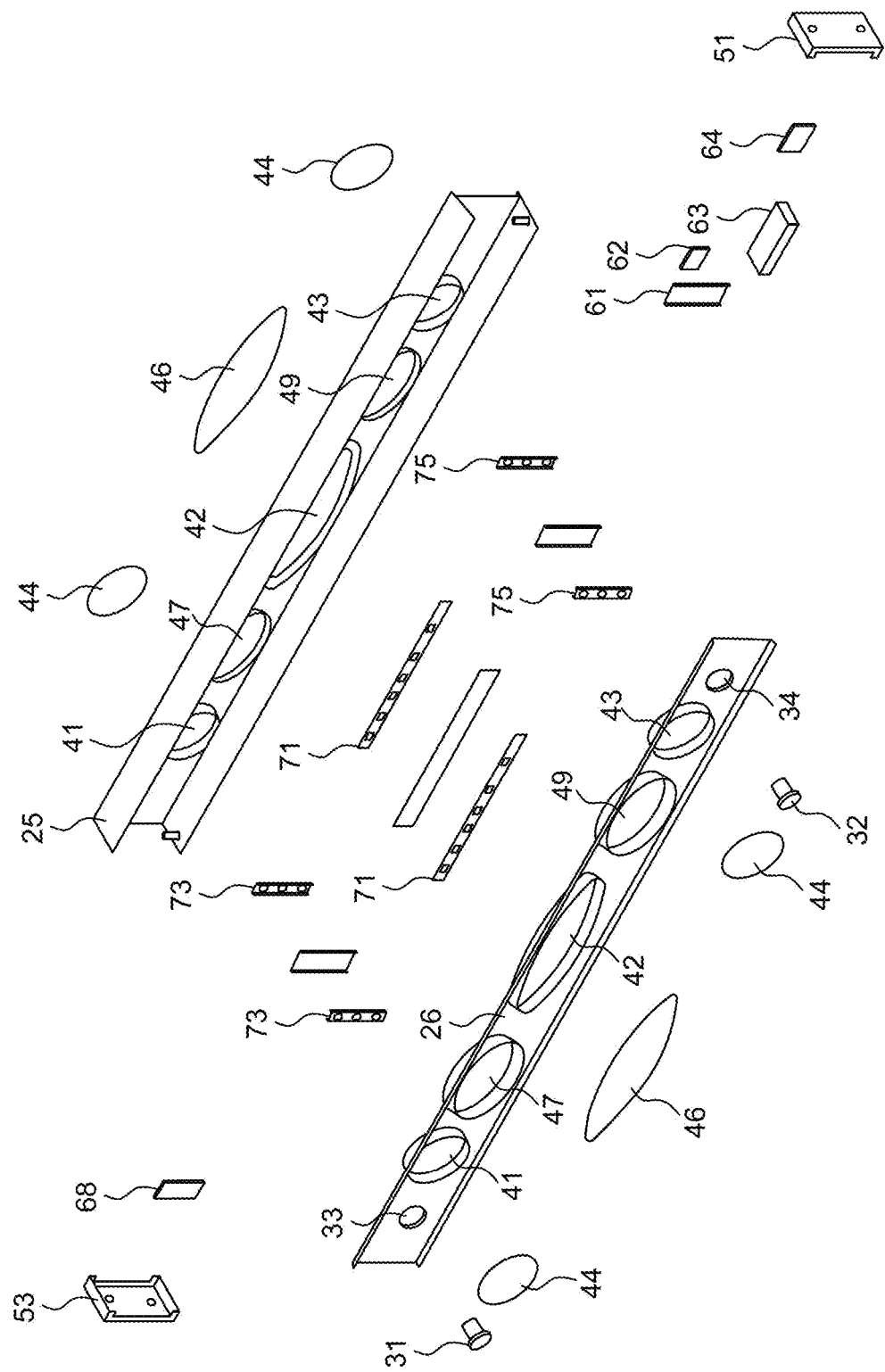
FIG. 4 is an exploded view showing the components of the invention.

As shown in the exploded view of FIG. 4, in the preferred embodiment, the housing 20 is constructed of a main housing 25, which includes the main body components described above, and an insert housing 26 attached thereto to hold the components. In the preferred embodiment the main housing 25 and insert housing 26 are made from standard molded plastic, and the two components are sized and configured to snap together to hold the various components in place. The housing 20 can also be made from aluminum. As can be seen in the exploded view, when viewed from the side, the main housing 25 has an open rectangle cross section, or a rectangle with one side missing, and the insert housing 26 is sized and configured to fit into place and essentially close the rectangle. The main housing 25 and insert housing 26 are configured such that there is a small interior space to hold all of the electrical components, as described below. In the preferred embodiment the insert housing 26 is sized and configured to snap into place inside the gap of the main housing 25, and then the two end caps, the right end cap 51 and the left end cap 53 are attached to hold the insert housing 26 to the main housing 25. In the preferred embodiment there are external ridges on the insert housing 26 and the main housing 25, and corresponding recesses on the end caps 51 and 53, and the end caps 51 and 53 are screwed into place onto internal posts to secure the components together. It is within the conception of the invention to snap or glue the components together.

The main housing 25 and insert housing 26 have corresponding components. Again, viewing from left to right, the main housing 25 and insert housing 26 have corresponding left circular openings 41, and situated within is the first vertical LED light strip 73, which consists of three multi-colored LED lights 74. The first vertical LED light strip 73 is attached within the circular opening 41 such that it is exactly perpendicular (90°) to the top 21 and bottom 22 surfaces. There is a small hole in the bottom of the circular opening 41 where the LED light strip 73 is attached to provide for the attached and unshown LED attachment wire 67. There are two clear circular protective lenses 44 placed in the left circular openings 41 to protect the first vertical LED light strip 72. These can be sized to snap into place, or can be glued into place. Moving to the right, both the main housing 25 and the insert housing 26 have aligned oval left hand-hold openings 47, so that when the insert housing 26 is attached in place against the main housing 25, the left hand-hold opening 47 is open through the housing 20. Continuing to the right, both the main housing 25 and insert housing 26 have corresponding and aligned central oval openings 42. The horizontal LED light strip 71 is inserted within, and attached therein to the central oval opening 42 so that the light strip 71 is parallel with the top 21 and bottom 22 surfaces. In the preferred embodiment, there are nine multi-colored LED lights 72 on the horizontal LED light strip 71, which will be controlled by the control circuit board 61. There is also a small hole in the side of the oval opening 42 for the unshown LED attachment wire 66. There are also two clear oval protective lenses 46 placed outwardly from the light strip 71 within the central oval opening 42 to protect the light strip 71. These protective lenses can be sized to snap into place, or can be glued into place. In the preferred embodiment there are three LED lights 74/76 in both the first and second vertical LED light strips 73/75, and these lights are also controlled by the controller circuit board 61.

Continuing to the right, both the main housing 25 and the insert housing 26 have aligned oval right hand-hold openings 49, so that when the insert housing 26 is attached in place against the main housing 25, the right hand-hold opening 49 is open through the body 20. Continuing to the right, the main housing 25 and insert housing 26 have corresponding right circular openings 43, and situated within is the second vertical LED light strip 75, which consists of three multi-colored LED lights 76. The second vertical LED light strip 75 is attached within the circular opening 43 such that it is exactly perpendicular (90°) to the top 21 and bottom 22 surfaces. There is a small and unshown hole in the circular opening 43 to allow the attachment of the LED attachment wire 67 to the LED light strip 75. There are two circular protective lenses 44 placed in the right circular openings 41 to protect the second vertical LED light strip 75. These protective lenses can be sized to snap into place, or can be securely glued into place. It is understood that all of the LED lights, 72, 74, and 76 are standard multi-colored LED lights, that can illuminate in any color as directed by the control circuitry, as described below. The light strips shown in FIG. 4, the horizontal light strip 71 and the two vertical light strips 73 and 75 are shown having two outwardly facing light strips placed on a central board (unnumbered), so that the lights illuminate outwardly.

Figure 3:
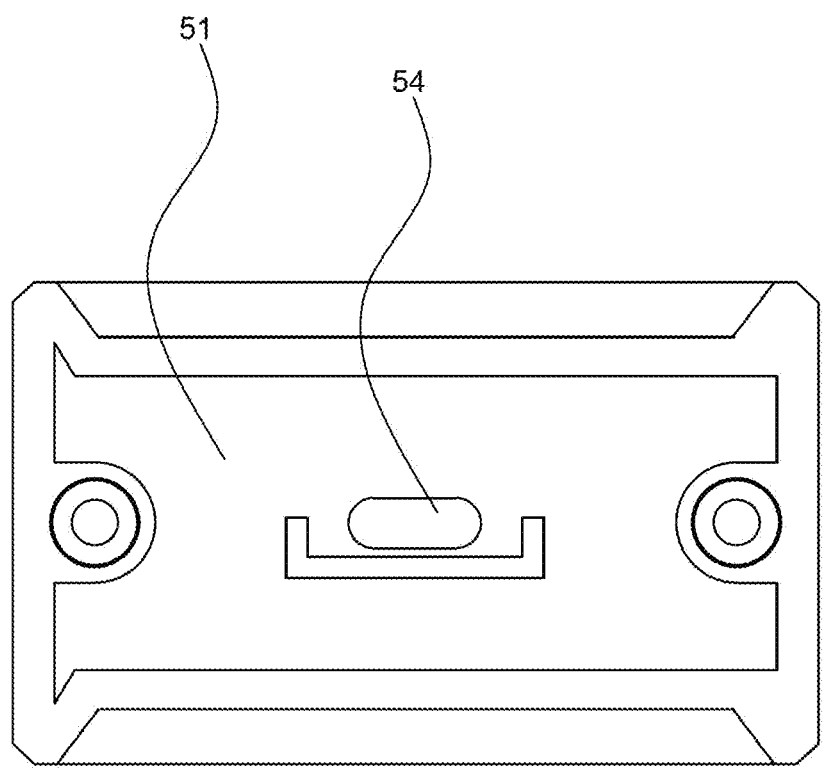
FIG. 3 is an end view of one side of the level showing the USB charging connector.

The electronic control circuitry is housed in the resulting space between the main housing 25 and insert housing 26, and electronically connected by appropriate wiring. The insert housing has two holes for the switches. On the left side there is a power button hole 33 for the power button 31, and on the right side there is a axis control hole 34 for the axis control button 32. The buttons 31 and 32 can extend through, and can also be held in place by a grommet. There is a power board 68 located behind the power button 31 so that when the power button 31 is pushed the corresponding controller is pressed on the power board to turn on the power to the system, if it is off, or turn off the power, if it is already on. There is power board wiring 69 that electronically connects the power board 68 to the controller circuit board 61. In the preferred embodiment the controller circuit board 61 is located behind the axis control button 32, and includes integrated control circuitry to control the orientation of the lights and configuration of the orientation sensor 62 as discussed below. Electronically attached to the controller circuit board 61 is a power supply battery 63, which in the preferred embodiment is a standard small lithium-ion battery, and electronically attached thereto is a battery charger 64. There is a USB attachment wire 65 attached to the battery charger 64 on one end, and the USB port 54 on the other end. In this embodiment, the USB port 54 is integrated into the right end cap 51, as shown in FIG. 3. There is also a rubber USB port cover, not shown, to fully cover the USB port and prevent it from being fouled by construction dust or debris.

There is an orientation sensor 62 attached to the controller circuit board 61. As described herein, the orientation sensor 62 can be either a standard and known accelerometer, or a standard and known inclinometer, both of which indicate the orientation of the device, typically in relation to gravity. In the preferred embodiment, there are two integrated sensors, which improves the ability of the sensor to determine orientation to horizontal. The common sensors can indicate in fractions of a degree (and typically displayed in tenths—0.10) the orientation of the device to horizontal, and they export this information electronically to the controller circuit board 61. These sensors are common paired with control circuitry to produce usable output data. There are a number of prior art patents, including U.S. Pat. Nos. 7,743,520 and 11,092,435, where the data is converted into a digital display that indicates the orientation of the device in degrees from horizontal. So if the display reads 1° it indicates that the device is 1 degree off of horizontal.

In the preferred embodiment, an orientation sensor 62, either an accelerometer or an inclinometer, is disposed within the housing 20 so that it indicates when the top 21 or bottom 22 surfaces are horizontal, or "level". The orientation sensor 62 is in electronic communication with the controller circuit board 61. In one embodiment this can be by a simple wire, but in another embodiment the two components can be housed in the same device. The controller circuit board 61 manipulates the data from the orientation sensor 62 and turns it into useful data, which will be displayed on the LED lights 72, 74, 76 as described below. The controller circuit board 61 also controls the power from the power button 31, the sensor orientation as managed by the axis control button 32, and the power supply as provided by the battery 63 and the battery charger 64. The axis control button 32 controls the controller circuit board 61 so that the accelerometer reads vertical. There is a horizontal LED attachment wire 65 attached between the control circuit board 61 and the horizontal LED light strip 71. There are two vertical LED attachment wires 67 attached between the control circuit board 61 and the two vertical LED light strips 73 and 75.

Figure 5:
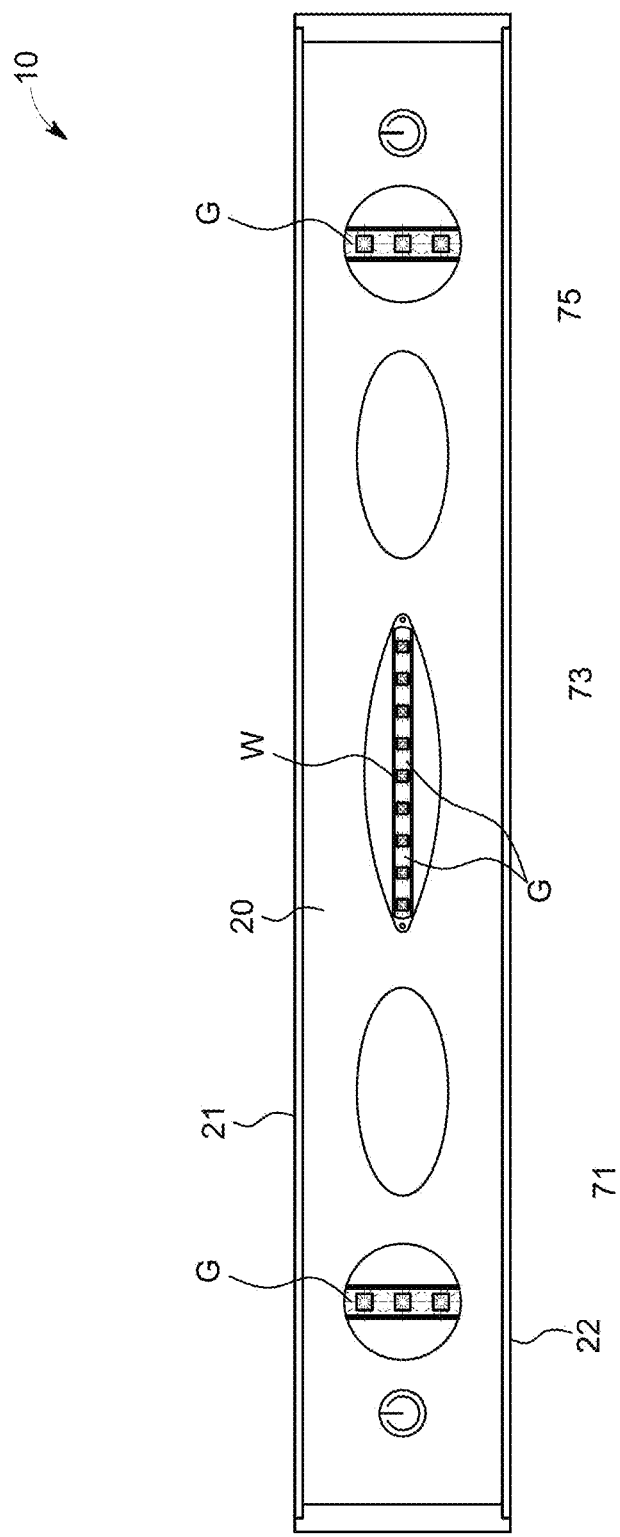
FIG. 5 is a front view showing the level indicating horizontal.

The controller circuit board 61 is in electronic communication with the lights 72, 74, and 76, such that, when in the horizontal orientation mode, and when the body 20 is 'level' or horizontal, all of the lights, including the first vertical LED light strip 73 and second vertical LED light strip 75, will indicate green, and on the horizontal LED light strip 71, all of the lights 72 will indicate green, with the exception of the center light, which will indicating white. This is depicted in FIG. 5, which shows all of the lights 72, 74, 76 of the light strips 71, 73, 75 illuminating green G, except for the center light of the horizontal strip 73, which illuminates white W. When the level 10 is not horizontal the orientation sensor 62 so indicates to the controller circuit board 61, which directs the lights to glow red, with the exception of one light on the horizontal light strip 71, which will indicate white. The LED lights 72, 74, 76, can produce any color as controlled by the controller circuit board 61, but green is used to indicate horizontal because green is universally used to indicate correct. Red is used to indicate that the level 10 is not horizontal (or vertical) because red is universally used to indicate wrong or incorrect. This creates an easily understood visual display to show when the level 10, and the surface it is placed on, is in the proper orientation. In this manner the level 10 is visually enhanced with the LED light display.

Figure 6A:
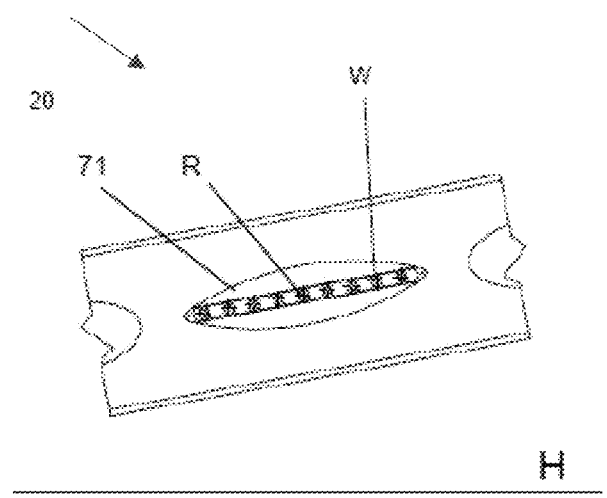
FIGS. 6a & 6b are front views of the central opening and light strip of the level with the light strip indicating which lights are illuminated on the horizontal light strip when the device is not horizontal.
Figure 6B:
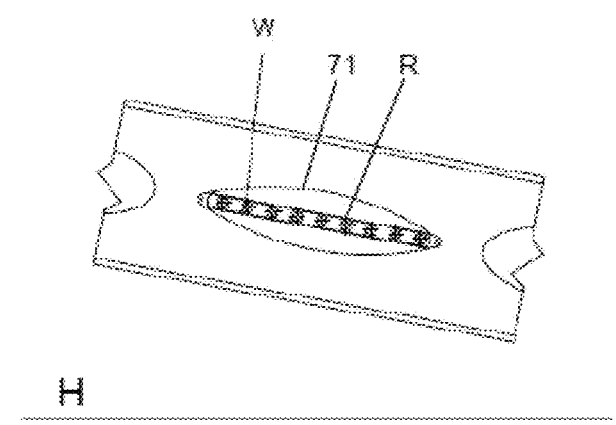

The control program within the controller circuit board 61 is configured so that the greater the degree from horizontal, the further from the center the white light in the LED strip 71 will be, which mimics the bubble in a standard vial level. FIG. 5 shows the level 10 at horizontal, with the white light W in the middle of the horizontal LED light strip 71, and all of the other lights 72, 74,76 displaying green G. This provides an easy visual cue that allows anyone near the level 10 to see if the level 10, or the surface it is resting on, is or is not to horizontal. FIG. 6a and FIG. 6b show the level 10 not horizontal. There is a horizontal line H, which shows horizontal, to show that the level 10 is not horizontal. In the preferred embodiment the white light moves with every degree, so if the level 10 is off level up to 1 degree, the white light will be one light off center. All of the remaining lights will be red R. If the level 10 is tipped up to the right, the white light W will be to the right, as shown in FIG. 6A, and the user will know that they need to either lower the right side or raise the left side. This provides an easy visual cue for anyone near to the level 10 to see, and to know how the work-piece needs to be moved. If the level is from between 1 degree and 2 degrees off level, the white light will be two lights from center, and all the other lights will indicate red. There are a total of nine LED lights 72 in the horizontal LED light strip 71 of the preferred embodiment, so the third light from center will illuminate if the level 10 is between 2 and 3 degrees from horizontal, and the fourth light will illuminate white if the level 10 is more than 3 degrees off level. And again, if the white light will indicate the high side of the level 10. FIG. 6B shows the level 10 with the left side raised and the white light W to the left.

Figure 7:
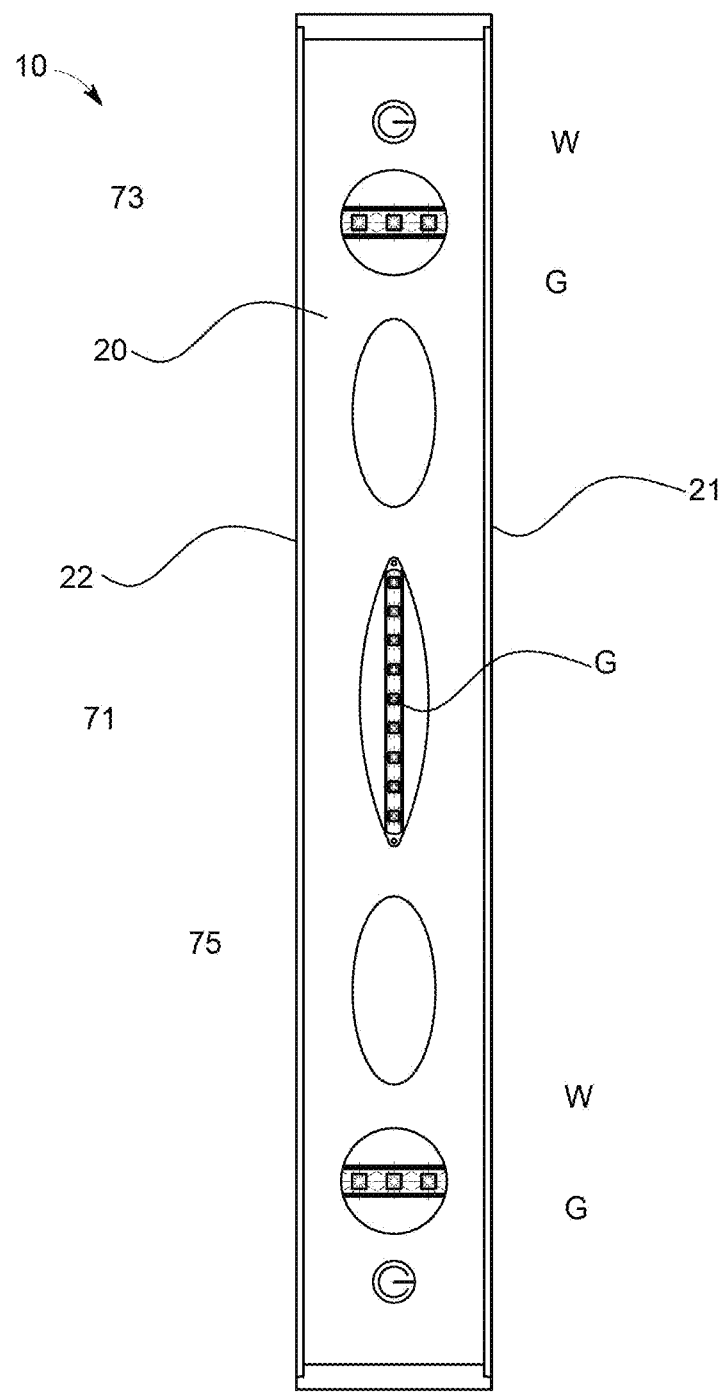
FIG. 7 is a front view of the level in the vertical orientation, and indicating vertical.
Figure 8:
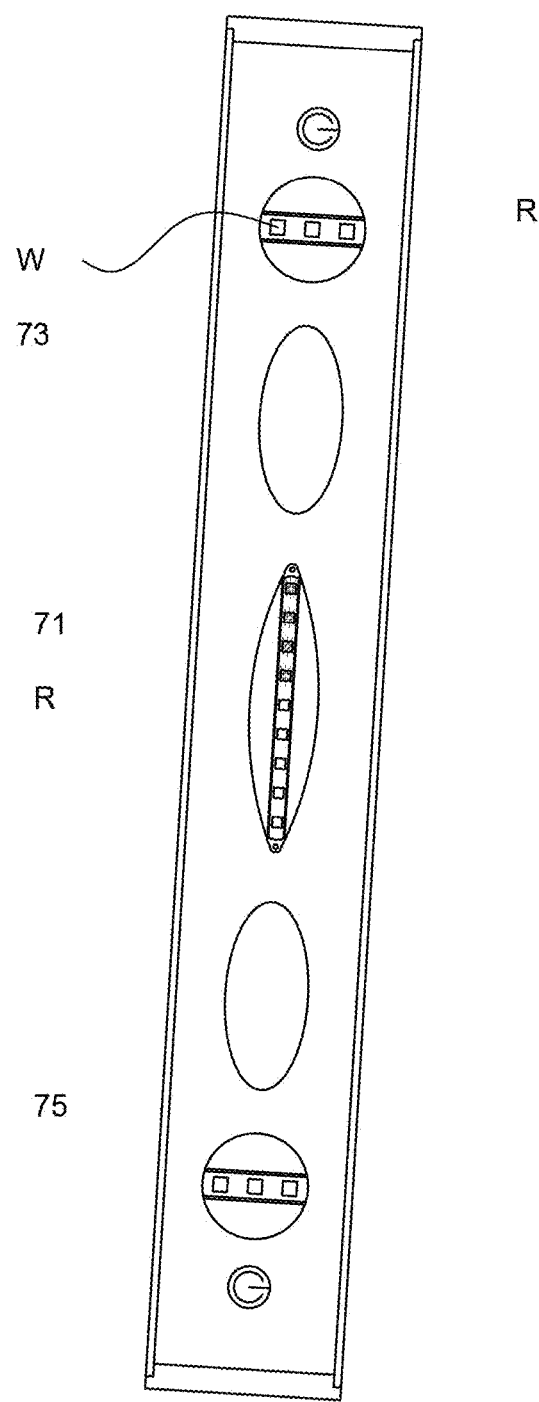
FIG. 8 is a front view of the level indicating that it is not vertical.

The level 10 operates similarly when the level 10 is placed in the vertical mode by depressing the axis control button 32. This instructs the orientation sensor 62 to read "plumb" or against the vertical direction of gravity, and instructs the controller circuit board 61 to provide vertical information to the lights 72, 74, 76. Since there are only three lights 74/76 in the vertical light strips 73/75, there is less information relating to the degree off vertical, but the white and red lights still convey the same information to allow the user to adjust the level 10 to move closer to vertical. FIG. 7 shows the level 10 in vertical, and shows the center lights of the first Vertical LED light strip 73 and second vertical LED light strip 75 to indicate white W, and all of the remaining lights to indicate green G. FIG. 8 shows the level a few degrees off of vertical, in this case leaning to the right, which is indicated by the white light W in the top LED light strip to be illuminated to the left. All of the remaining lights indicate red R. Again, this mimics the position of the bubble in a standard bubble level, and most skilled users know to move the level towards the white light.

The present invention is well adapted to carry out the objectives and attain both the ends and the advantages mentioned, as well as other benefits inherent therein. While the present invention has been depicted, described, and is defined by reference to particular embodiments of the invention, such reference does not imply a limitation to the invention, and no such limitation is to be inferred. The depicted and described embodiments of the invention are exemplary only, and are not exhaustive of the scope of the invention. Consequently, the present invention is intended to be limited only be the spirit and scope of the claims, giving full cognizance to equivalents in all respects.

I claim:

1. A visually enhanced LED light display level comprising;
    a housing having a top planar surface and a bottom planar surface,
    an orientation sensor integrated within the housing and aligned to be oriented with the top planar surface and the bottom planar surface, such that the orientation sensor measures whether the housing is horizontally aligned with the horizon of the earth;
    an electronic controller circuit board in electronic communication with the orientation sensor;
    a strip of multiple display lights in electronic communication with the electronic controller circuit board;
    wherein when the housing is horizontal the controller circuit board instructs the display lights glow one color, and when the housing is not level the controller circuit board instructs the display lights glow a different color.

2. The visually enhanced LED light display level of claim 1, wherein the lights display green when level and red when not level.

3. The visually enhanced LED light display level of claim 2, further comprising;
    control programing within the electronic controller circuit board that processes data from the orientation sensor to indicate the degree off of horizontal through the display lights, such that when the right end of the housing is higher than the left, a single white light will be illuminated to the right of center of the light strip, and when the left end of the housing is higher than the right, the single white light will be illuminated to the left of center, and all of the other lights will illuminate red.

4. The visually enhanced LED light display level of claim 3, wherein the control programming will control the lights to indicate the degree off level, with the white light further from the center, the greater degree the housing is off horizontal.

5. The visually enhanced LED light display level of claim 4, wherein said strip of multiple display lights has nine lights.

6. The visually enhanced LED light display level of claim 1, further comprising;
    a first vertical led light strip positioned within a left circular opening positioned on a left side of said housing, a second vertical led light strip positioned within a right circular opening positioned on a right side of said housing;
    an axis control switch in electronic communication with the controller circuit board such that when the axis control switch is activated, the controller circuit board orients the housing to vertical, and wherein further the controller circuit board controls the lights to indicate the degree off of vertical, by indicating one color when the housing is vertical and a second color when the housing is not vertical.

7. The visually enhanced LED light display level of claim 6, wherein the lights display green when level and red when not level.

8. An LED light display level comprising;
    a housing having a top planar surface and a bottom planar surface,
    an orientation sensor integrated within the housing and aligned to be oriented with the top planar surface and the bottom planar surface, such that the orientation sensor measures whether the housing is horizontally aligned with the horizon of the earth;
    an electronic controller circuit board in electronic communication with the orientation sensor;
    a strip of multiple display lights in electronic communication with the electronic controller circuit board;
    wherein when the housing is horizontal the controller circuit board instructs the display lights glow one color, and when the housing is not level the controller circuit board instructs the display lights glow a different color, wherein the lights display green when level and red when not level;
    control programing within the electronic controller circuit board that processes data from the orientation sensor to indicate the degree off of horizontal through the display lights, such that when the right end of the housing is higher than the left, a single white light will be illuminated to the right of center of the light strip, and when the left end of the housing is higher than the right, the single white light will be illuminated to the left of center, and all of the other lights will illuminate red;

wherein the control programming will control the lights to indicate the degree off level, with the white light further from the center, the greater degree the housing is off horizontal.

9. The LED light display level of claim 8, further comprising;

a first vertical led light strip positioned within a left circular opening positioned on a left side of said housing, a second vertical led light strip positioned within a right circular opening positioned on a right side of said housing;

an axis control switch in electronic communication with the controller circuit board such that when the axis control switch is activated, the controller circuit board orients the housing to vertical, and wherein further the controller circuit board controls the lights to indicate the degree off of vertical, by indicating green when the housing is vertical and red when the housing is not vertical.

* * * * *